(12) United States Patent
Sutter et al.

(10) Patent No.: US 12,704,692 B2
(45) Date of Patent: Aug. 11, 2026

(54) OPTICAL CONNECTIVITY MODULE AND CHASSIS

(71) Applicant: HUBER+SUHNER AG, Herisau (CH)

(72) Inventors: Christian Sutter, Abtwil (CH); David Vollenweider, Niederwil (CH); Dmitry Tsyplakov, Waldstatt (CH)

(73) Assignee: HUBER+SUHNER AG, Herisau (CH)

( * ) Notice: Subject to any disclaimer, the term of this patent is extended or adjusted under 35 U.S.C. 154(b) by 212 days.

(21) Appl. No.: 18/278,894

(22) PCT Filed: Mar. 4, 2022

(86) PCT No.: PCT/EP2022/055505

§ 371 (c)(1),
(2) Date: Aug. 25, 2023

(87) PCT Pub. No.: WO2022/189272

PCT Pub. Date: Sep. 15, 2022

(65) Prior Publication Data

US 2024/0053563 A1 Feb. 15, 2024

(30) Foreign Application Priority Data

Mar. 9, 2021 (DE) ..................... 10 2021 105 665.9

(51) Int. Cl.
*G02B 6/44* (2006.01)

(52) U.S. Cl.
CPC ....... *G02B 6/4453* (2013.01); *G02B 6/44526* (2023.05); *G02B 6/44528* (2023.05)

(58) Field of Classification Search
CPC .............. G02B 6/4453; G02B 6/44526; G02B 6/44528
See application file for complete search history.

(56) References Cited

U.S. PATENT DOCUMENTS 4,765,709 A 8/1988 Suillerot et al.
5,975,769 A 11/1999 Larson et al.
(Continued)

FOREIGN PATENT DOCUMENTS

EP 3 317 707 B1 5/2018
EP 3 528 023 A1 8/2019
(Continued)

OTHER PUBLICATIONS

EPO (Rijswijk, NL), English language version of the International Search Report, Form PCT/ISA/210, for International Application PCT/EP2022/055505, Jun. 9, 2022 (2 pages).
(Continued)

*Primary Examiner* — Sung H Pak
(74) *Attorney, Agent, or Firm* — Pauley Erickson & Swanson

(57) ABSTRACT

An optical connectivity module suitable for installation in a corresponding chassis. The connectivity module typically comprises a housing defining an interior and comprising a front face, wherein at least one row of adapters suitable to receive thereto corresponding optical connectors from the interior and from the exterior, the row of adapters being arranged in the front face spanning essentially across a total width of the front face. Usually at least one cable channel leading into the front face above or below the row of adapters, for routing therein at least one optical cable across the front face being during operation interconnected to at least one of the adapters of the row of adapters from the interior.

16 Claims, 3 Drawing Sheets

(56) References Cited

U.S. PATENT DOCUMENTS

| | | | | |
|---|---|---|---|---|
| 6,208,796 | B1 | 3/2001 | Williams Vigliaturo | |
| 10,656,360 | B2 | 5/2020 | Sedor et al. | |
| 2006/0165366 | A1 | 7/2006 | Feustel et al. | |
| 2013/0004125 | A1 | 1/2013 | Abbiati et al. | |
| 2018/0329166 | A1 * | 11/2018 | Krampotich | G02B 6/4446 |

FOREIGN PATENT DOCUMENTS

| | | | |
|---|---|---|---|
| WO | WO 2013/078322 | A2 | 5/2013 |
| WO | WO 2020/081942 | A1 | 4/2020 |
| WO | WO 2020/205133 | A1 | 10/2020 |

OTHER PUBLICATIONS

Electronic Components, Assemblies & Materials Association (ECA), “EIA/ECA Standard,” Dec. 2005, EIA/ECA-310-E, Elect. Indus. Alliance 2005, Arlington, VA (28 pp.), cited in the opposition to DE 10 2021 105 665.

German Patent and Trademark Office, “Grounds of Objections,” in German langauge, May 24, 2023, (22 pp.), cited in the opposition to DE 10 2021 105 665.

German Patent and Trademark Office, “Provsional Decision,” in German language, Nov. 24, 2023, (2 pp.), cited in the opposition to DE 10 2021 105 665.

German Patent and Trademark Office, “Decision,” in German language, Dec. 21, 2023, (10 pp.), cited in the opposition to DE 10 2021 105 665.

* cited by examiner

OPTICAL CONNECTIVITY MODULE AND CHASSIS

CROSS REFERENCE TO RELATED APPLICATION

This application is a National Phase filing in the United States, under 35 USC § 371, of PCT International Patent Application PCT/EP2022/055505, filed on 4 Mar. 2022 which claims the priority of German Patent Application No. DE 10 2021 105 665.9, filed 9 Mar. 2021.

The above-referenced applications are hereby incorporated by reference herein in their entirety and are made a part hereof, including but not limited to those portions which specifically appear hereinafter.

BACKGROUND OF THE INVENTION

Field of the Invention

The present disclosure relates to the field of Optical connectivity modules and chassis therefore.

Discussion of Related Art

U.S. Ser. No. 10/656,360B2 was first published in August 2019 on behalf of Panduit Corp. It is directed to various implementations of epoxy transitions for fiber optic modules. A fiber optic module system may include a fiber optic module holding a plurality of multi-fiber adapters at a front of the fiber optic module, a multi-fiber cable, and an epoxy transition to transition the multi-fiber cable to a plurality of individual optical fibers inside the fiber optic module. The epoxy transition may be filled with an epoxy to secure the individual optical fibers inside the epoxy transition.

US2006165366A2 was first published in 2006 on behalf of Furukava Electric North America Inc. It is directed to an optical power splitting module apparatus. The module apparatus includes at least one input port, one or more multi-fiber output ports. An optical fiber-splitter device is coupled there between. The optical splitter device has a first end configured as at least one single optical fiber, and a second end configured as one or more multi-fiber groups. The first end of the splitter device is coupled to the input port and the second end of the splitter device is coupled to the output ports. The first end of the splitter device is, e.g., an LC connector. The second end of the splitter device is, e.g., one or more Multi-fiber Push On (MPO) connectors. The optical splitter device is, e.g., a 1×N planar lightwave circuit (PLC) splitter, such as a 1×32 PLC splitter with an LC input connector and four 8-fiber MPO output connectors.

U.S. Pat. No. 5,975,769A was first published in 1999 on behalf of Telect Inc. It discloses a universal and versatile fiber optic cable module system which can be used in combination with any one of a plurality of different front plates. The system also discloses module housings which can be combined with one another and attached to a front plate. Also disclosed is a method for providing such a universal and versatile fiber optic cable module system.

U.S. Pat. No. 6,208,796 was first published in 1998 on behalf of Commscope Technologies LLC. It is directed to a fiber optic module which includes front adapters for connection to fiber optic connectors, and rear adapters for connection to fiber optic connectors. The module includes two circuits having passive optical couplers inside, and adapters exposed along the front and the rear of the module. The module is usable in cross-connect applications with itself or with other modules. The adapters are selectively connectable to fiber optic connectors. The front adapters of the module include two receive input ports and two transmit output ports. The front of the module also includes two visual indicators, one for each circuit. The visual indicators include a lens cap at least partially transparent to visual light in light communication with an optical fiber. The rear adapters of the module include two transmit input ports and two transmit output ports. Monitor ports are also located on the rear for both the transmit and receive signals. The receive monitor ports also function as the input ports for an identification signal sent in the reverse direction for illuminating the visual indicators along the front of the module or another module. Alternatively, separate identification signal input ports can be provided on the front as adapters.

U.S. Pat. No. 4,765,709 was first published in 1988 on behalf of Telecommunications SA. It is directed to an optical fiber distributing and connecting equipment in the form of a box in which first optical fibers fanned-out from first cables are connected to second optical fibers fanned-out from second cables by means of fiber-to-fiber connectors. In order to achieve easy mixing of the second fibers while ensuring that their lengths remain substantially equal, the connectors are laid out in a circular region. This region includes one or more circular, coaxial and possibly stacked slides, on which the connectors are slidably mounted. Ends of the first fibers are inserted in first ends of the connectors located on the outer edge of the slides, and the ends of the second fibers are deployed radially from the central axis of the slides and inserted in the second ends of the connectors located on the inner edge of the slides. A central hole in a disk coaxial with the slides groups together the second fibers close to the central axis of the slides. Holes spread around the periphery of the disk group the first fibers into bundles around the central axis.

SUMMARY OF THE INVENTION

Optical connectivity modules as known from the prior art typically use a front-rear concept where incoming cables or pre-terminated cables are entering from one side (typically rear side) and outgoing cables are typically accessible from the front side. In those arrangement the cabinets/racks require usually access from both, front and rear side which needs extra floor space. In specific applications, users benefit from having both incoming and outgoing cables accessible from the front side only as the access can be much simpler. There are connectivity modules on the market which allow this. However, in these scenarios (e.g., AFL Hyperscale) cable glands (or connectors) for incoming cables are using up additional space in the front plate and overall port density is lower compared to front-rear concept.

An optical connectivity module, hereinafter referred to as module, according to the present disclosure addresses this problem. It achieves high port-density and at the same time offers full front-access to the connectivity. If required, it can be additionally foreseen that incoming cables can be routed also form the rear in a conventional way.

The present disclosure foresees that incoming cables are interconnected on an inside (interior space) of a housing of the module to adapters arranged in a front face of the housing. The incoming cables are routed through a channel from the rear to the front within the overall dimension of the front face of the module with the cable passing through the front face of the module across a dedicated mouth opening. If appropriate, the channel can be equipped with various down-holders while the module design is ensuring a minimal fiber bending radius is assured. It should be mentioned, that the terms "incoming" and "outgoing cable" do not indicate that the signals in those cables are limited to only one direction.

Existing technologies usually either require front rear access or front access, wherein incoming cables need to enter the module from the front demanding additional space and thus a reduced port density.

According to the present disclosure incoming cables usually lead directly or with a connector (such as, but not limited to, MTP or MPO) into the modules and being routed through a channel which is described in more detail hereinafter from the rear to the front within the overall dimension of the front face of the module. The channel can be designed in an open (externally accessible) way so that the cable can be placed inside or taken out very easily without having to open the module or thread the cable through. Depending on the design, the cross-section of the channel can vary over its length. Some retaining elements can be foreseen to help keep the incoming cable in place and simplify handling of the module during installation. Appropriate minimum guiding radii will ensure that cable is not kinked when put under tension.

The mouth opening in the front face of the housing is preferably arranged between two rows of adapters or adjacent to them as described in more detail hereinafter. However, the disclosure is not limited to modules comprising two rows, as the same advantages can be achieved also for modules comprising at least one row of adapters. One advantage is that no additional plugs/adapters/cable glands etc. are required in the front face of the modules. In this way the routing of the cable to the rear side of the housing, where it usually enters the housing, only use a minimum of the available front-space in the size of the cross section of the cables.

Another advantage of present disclosure is that the modules, if required, can be installed in the chassis from the front as well as from the rear side. The modules can also easily be removed and inserted from the rack/cabinet from the front side even with all connections (front and rear) attached to it. In conventional front-rear concepts all connections need to be disconnected on one side. Still, the module can be removed only from the other side.

A module according to the disclosure can be designed, but not limited to, such that it can be installed horizontally in 1U chassis and vertically in 2U or 3U chassis. If appropriate, the in the vertical arrangement incoming cables can be guided in a common horizontal channel and kept well separated from outgoing cables from front connections. In a variation, where an incoming interface is placed in a rear side of the module, incoming cables can either be connected from the front (using the channel in the module) or in a conventional way from the rear as it is typical in front-rear solution (without routing the cable within the module to the front).

According to the present disclosure different types of modules can be designed. Some of them are mentioned hereinafter:

Pre-terminated modules: This module is a module which is pre-connectorized (at the rear side) directly with a specific cable length. The user can directly install the module in the chassis and can connect outgoing patch cords. There are various configuration of pre-terminated modules:

| Name | A-end | B-end |
|---|---|---|
| Module to module | Connectors terminated directly to fibers. Connections placed inside of the module. | Connectors terminated directly to fibers. Connections placed inside of the module. |
| Module to harness | Connectors terminated directly to fibers. Connections placed inside of the module. | Connectors terminated directly on fibers. With a fan-out of certain lengths. |
| Blunt-cut modules | Connectors terminated directly to fibers. Connections placed inside of the module. | Loose end for splicing. |
| Module to MTP | Connectors terminated directly to fibers. Connections placed inside of the module. | Fibers terminated directly on Nx MTP connectors. |

Patch modules: A patching module is a straight-through patching field that allows to connect different types of cable assemblies directly to cords.

Transition modules: A transition module converts MTP backbone cables to LC or SC simplex (or other types) connectivity.

Splice modules: Inside the module fibres are spliced.

Splitter modules: Splitter modules are usually passive optical devices. They are used to split the signal between various subscribers.

CWDM/DWDM modules: Are modules containing transport network passive elements such as multiplexers, demultiplexers, add-drops (OADM) and other relevant devices.

A module according to the disclosure usually comprises a housing defining an interior space. As mentioned above, the housing comprises a front face in which at least one row of adapters preferably at least two rows of adapters are arranged spanning essentially across a total width of the front face. The adapters are suitable to receive thereto corresponding optical connectors from the exterior and from the interior of the housing. The module comprises at least one cable channel ending in the mouth opening arranged in the front face of the housing. An incoming cable may pass through the front face of the housing via the mouth opening which can be kept in difference to the prior art, very small and saves space. In the front face of the housing, the mouth opening is with respect to the general direction of the row of adapters arranged laterally offset. Preferably the mouth opening is arranged close to a side wall of the housing, in particular adjacent to a side wall of the housing. If appropriate the cable channel can be designed in a bend manner, such that the mouth opening can be arranged towards the center of the front face of the housing. From there the channel can traverse towards a side face of the housing in compliance with the minimum bending radii of the optical cables to be routed therein.

In a preferred variation, the cable channel is arranged in a side face of the housing accessible from the exterior. This has the advantage that the at least one optical cable can be routed during installation in the cable channel and therefrom through the front face. However, the at least one optical cable may also be routed not across the front face, depending on the circumstances, as there is no need for a pre-routing of the optical cable before installation of the connectivity module and the cable channel being accessible from the exterior. This results in increased flexibility of the routing of the optical cable. In some variations, the cable channel is incorporated as an elongated indentation in the side face. This implements an externally accessible cable channel, however, an at least partially internal cable channel is possible as well. The elongated indentation has preferably a U-shaped cross-section, however other shapes are thinkable. Typically, the elongated indentation is arranged essentially parallel to the general direction of the (first) side face.

In a preferred variation, the housing comprises a front section and a rear section adjoining the front section. The front section usually comprises the front face, a first side face, comprising the at least one cable channel, and a thereto opposite second side face extending essentially parallel to the first side face. The first and the second side faces usually adjoin the front face essentially perpendicular on opposite ends. The front section generally serves the purpose of accommodating at least one row of adapters. If appropriate, it can also comprise means to install the connectivity module in corresponding chassis. The front section and the rear section usually encompass a common interior space in which optical cables are arranged. The rear section comprises an arch-shaped rear wall. The rear section usually has a width less than or equal to the total width of the front face. Preferably the arch-shaped rear wall has at least generally a curvature greater than or equal to a minimal bend radius of an optical cable, such that optical cables can be routed along the rear wall on the exterior and/or on the interior without being damaged, respectively influencing the transmission ratio. The curvature of the rear wall may vary along its length extending around the rear section. The rear wall can be interconnected to first side face and or the second side face via an offset extending essentially parallel to the front face. The rear section generally serves the purpose of routing optical cables internally and externally, which need to change direction.

In some variations the connectivity module comprises at least one auxiliary connector arranged adjacent to the rear wall and the second side face for interconnecting an optical cable to at least one of the adapters on the interior. Alternatively, or in addition, the connectivity module comprises at least one cable gland arranged adjacent to the rear wall and the second side face for leading the optical cable into the interior. In a preferred variation the auxiliary connector and/or the cable gland are arranged at the inwardly extending offset between the second side face and the rear wall. An optical cable routed from an intermediate region between the second side face and the rear wall, along the rear wall, through the cable channel in the first side face protects the auxiliary connector and/or the cable gland against tensile loads during installation or operation.

If appropriate at least one cable holder (down-holder) is arranged at the rear section. The cable holder usually comprises a guiding surface extending at least partially parallel to rear wall, for holding and guiding at least one optical cable routed externally along the rear wall. In some variations the cable holder is essentially L-shaped, for limiting a displacement of an optical cable in two directions essentially perpendicular to the optical cable. Preferably two or more cable holder are arranged along the rear wall, in particular having an alternating arrangement, such that an optical cable routed externally along the rear wall is at least partially encompassed.

Depending on the field of application a first row of adapters and a second row of adapters are arranged in the front face laterally offset from each other with respect to their general direction, each spanning essentially a total width of the front face. It should be understood that more than two rows are possible as well, for even further increasing the number of adapters per connectivity module. Preferably is the lateral offset between the first and the second row essentially equal to a diameter of the cable channel leading into the front face between the first and the second row. This way a compact construction is possible.

In some variations the housing comprises an interior partitioning wall extending at least partially between the first and the second row of adapters and spatially partitioning the interior into a first level extending from the first row and a second level extending from the second row. This increases the overall stability of the housing and simplifies the assembly of the connectivity module, as the optical cables being connected to the adapters of one level are spatially separated from the optical cables of arranged on the other level.

If appropriate, the connectivity module comprises a feedthrough arrangement comprising an internal opening in the partitioning wall forming a feedthrough for routing optical cables from the first level to the second level or vice versa. For easy assembly the feedthrough arrangement preferably comprises a lateral opening in the housing accessible from the exterior and adjoining the internal opening. In a variation the lateral opening extends essentially perpendicular to the partitioning wall, such that optical cables can be inserted oriented transversely to the partitioning wall via the lateral opening into the internal opening The feedthrough arrangement is typically arranged in the rear section or the intermediate region between the second side face and the rear wall. The feedthrough arrangement makes a cumbersome pushing of optical cables through the internal opening during assembly and/or installation of the connectivity module obsolete.

The housing may comprise a detachable top cover and a thereto essentially parallel arranged detachable bottom cover, respectively adjoining the front face essentially perpendicular on opposite ends of the front face. The lateral opening typically spans between the top cover and the bottom cover.

For a secure installation of the connectivity module in a corresponding chassis, the side face comprises retaining means configured to engage with the corresponding chassis, such that a predefined installation position is retained. The retaining means can comprise at least one protrusion extending from the side face for engaging with a corresponding indentation of the chassis. The at least one protrusion is usually integrally formed with the side face, however a separate part forming the protrusion is thinkable as well. Alternatively, or in addition, at least one latch for engaging with a corresponding indentation of the chassis and a to the latch mechanically interconnected lever for releasing the latch are respectively arranged on at least one of the side faces. The latch is usually formed as lateral protrusion extending from the lever. The latch can be wedge-shaped, with one side being angled with respect to the side face and another side extending essentially perpendicular to the side face, however other shapes are possible. The lever preferably extends at least partially in the side face towards the front face. In some variations the lever extends from the side face across the front face essentially perpendicular thereto, such that the lever is actuatable when the connectivity module is installed in a corresponding chassis. In other variations, the lever extends from the side face towards the rear wall, wherein the housing comprises a lateral indentation, typically arranged between the front section and the rear section, allowing a lateral actuation of the lever into the indentation from the rear for releasing the latch.

Depending on the design, the front section comprises at least one guiding means which extends essentially parallel to the cable channel, for guiding the connectivity module during insertion into the corresponding chassis. For good performance the guiding means are arranged at least partially along the (first) side face. The guiding means can comprise a guiding rail and/or guiding edge and/or guiding surface. In a preferred variation the guiding means are arranged adjacent to the cable channel and formed as edges of the elongated indentation and/or the adjoining exterior surface of the side face.

A second aspect of the disclosure is directed to a chassis configured to receive at least one Optical connectivity module as described above, wherein the chassis comprises at least one sub-chassis suitable to receive at least one Optical connectivity module, in particular two or more Optical connectivity modules. The sub-chassis is preferably configured to be insertable into the chassis.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described disclosure will be more fully understood from the detailed description given herein below and the accompanying drawings which should not be considered limiting to the disclosure described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
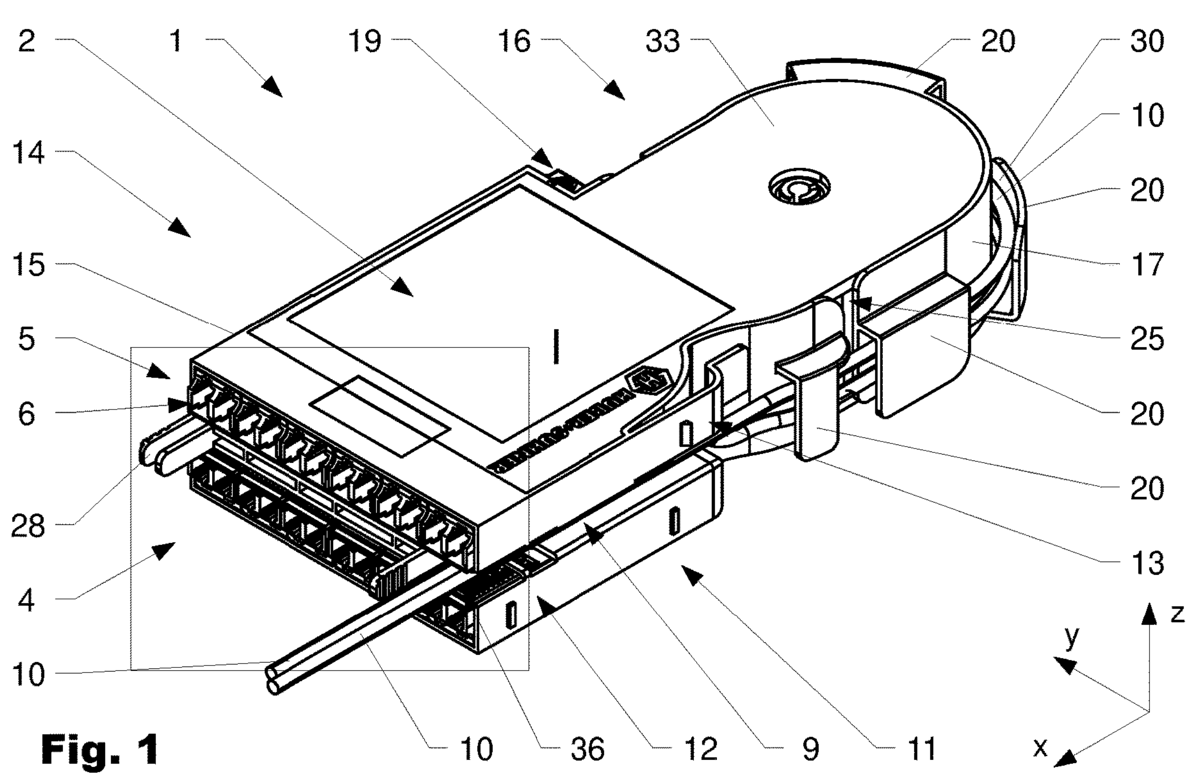
FIG. 1 shows a perspective view of a first variation of an Optical connectivity module according the disclosure.
Figure 2:
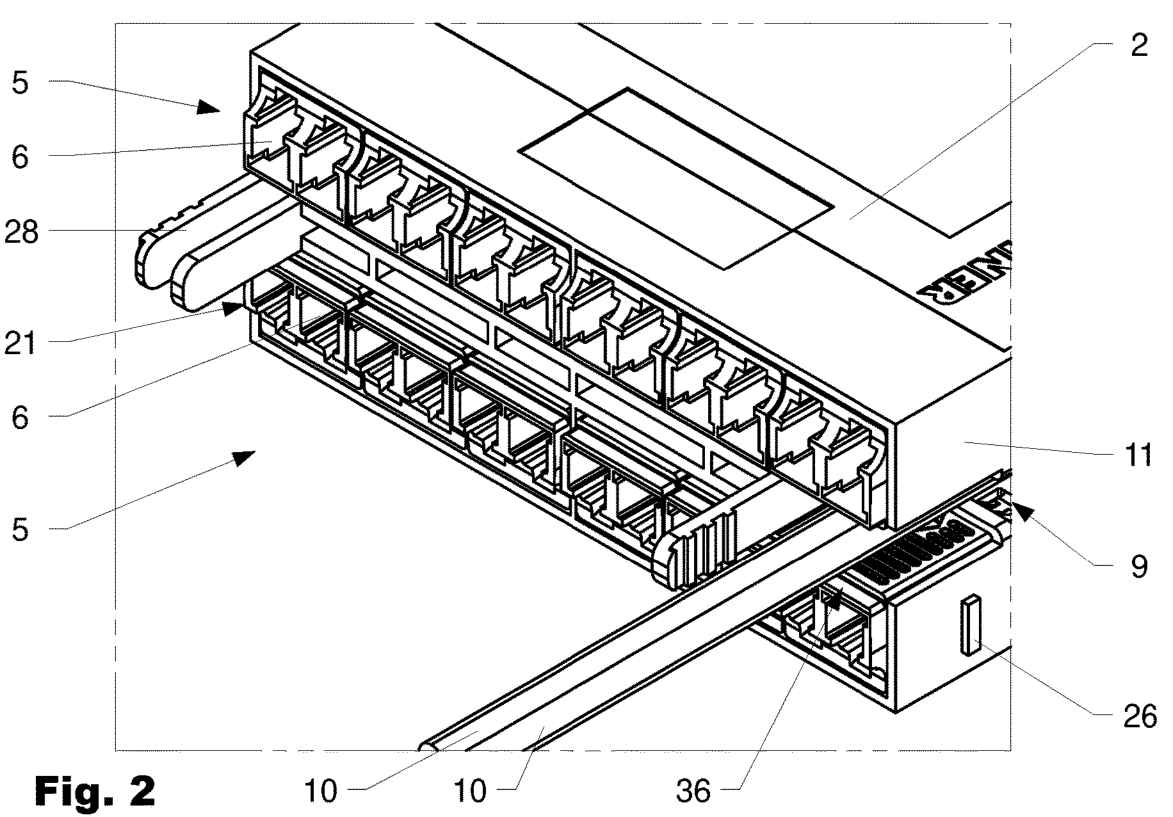
FIG. 2 shows a detailed view of FIG. 1 indicated by the box with label I.
Figure 3:
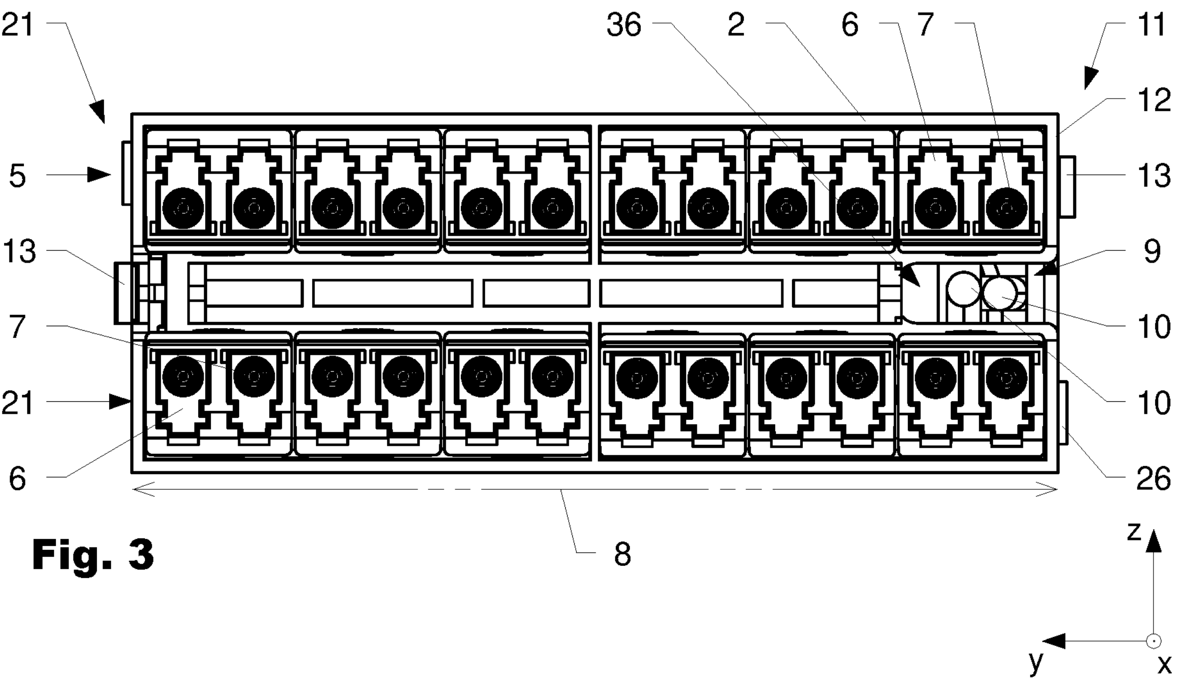
FIG. 3 shows a view of the front face of the first variation of FIG. 1.
Figure 5:
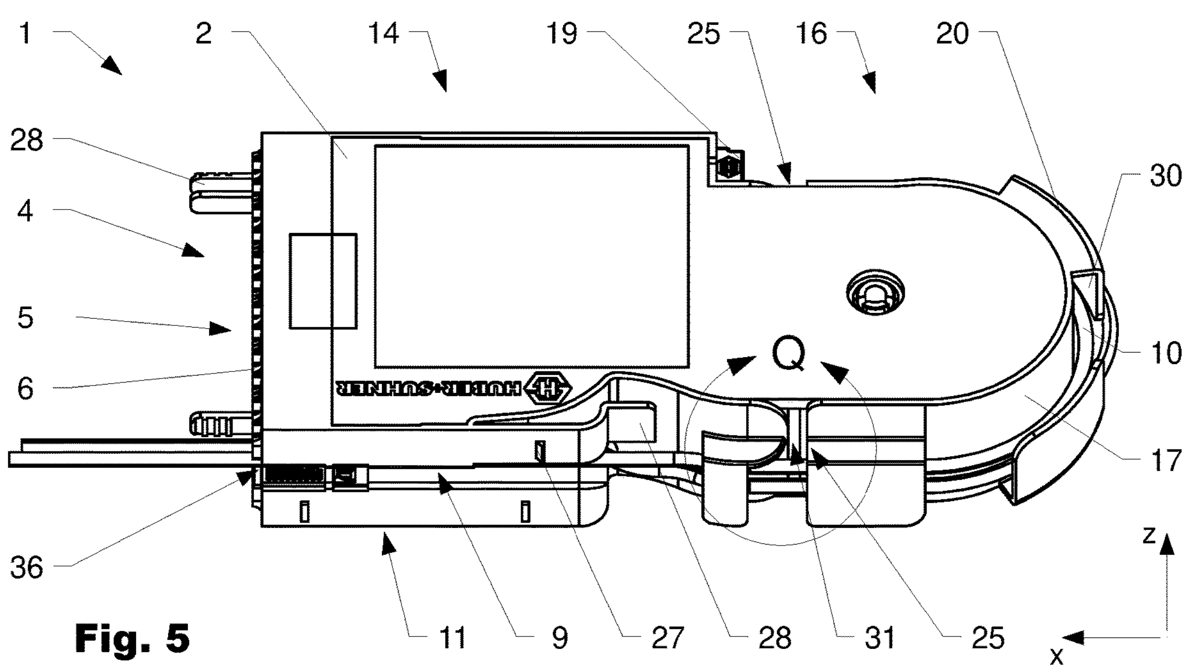
FIG. 5 shows another perspective view of the first variation of FIG. 1.
Figure 6:
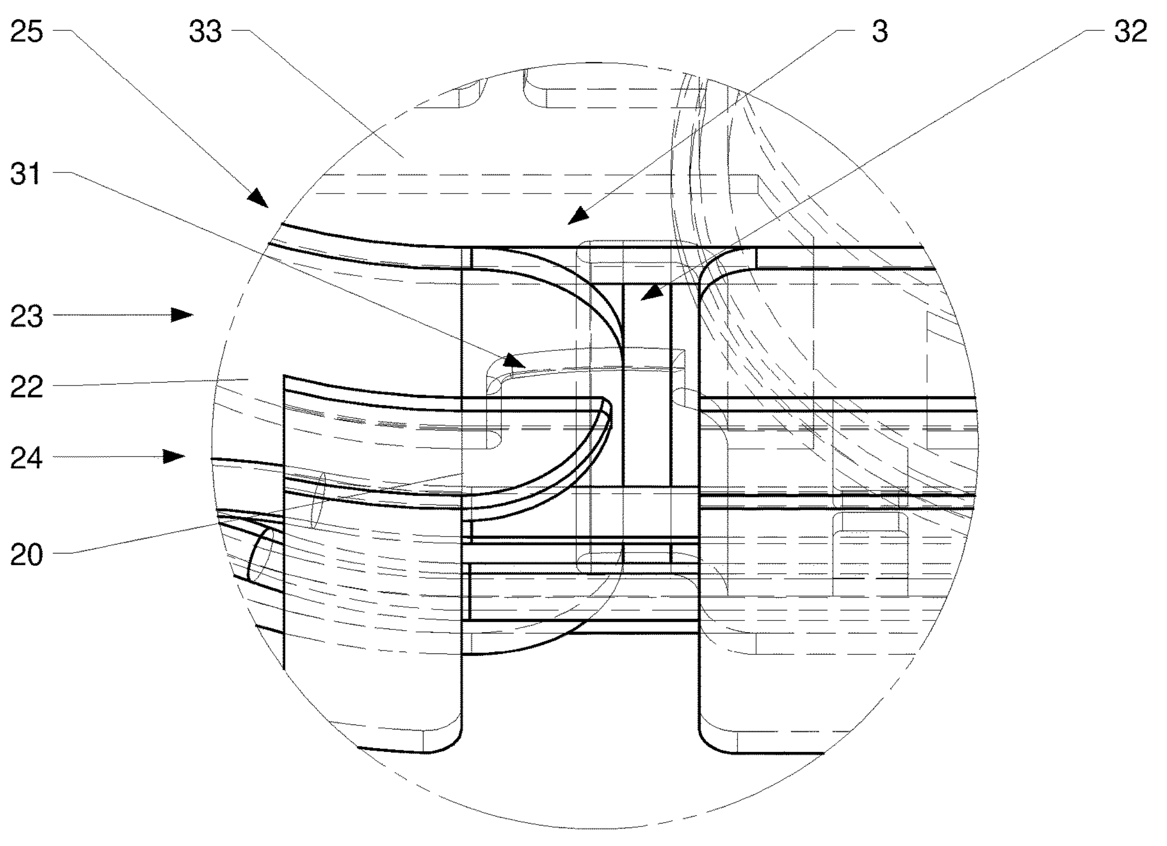
FIG. 6 shows a detailed view of FIG. 5 indicated by the circle with label Q, showing hidden lines.

FIG. 1 shows a perspective view of a first variation of an Optical connectivity module 1 according the disclosure and FIG. 2 shows a detailed view of FIG. 1 indicated by the box with label I. FIG. 3 shows a view of a front face 4 of the first variation of FIG. 1, whereas FIG. 4 comprises a perspective view of the first variation of FIG. 1. FIG. 5 shows another perspective view of the first variation of FIG. 1 and FIG. 6 shows a detailed view with hidden lines of FIG. 5 indicated by the circle with label Q.

The first variation of the connectivity module 1 as shown in FIGS. 1 to 6 comprises a housing 2 defining an interior 3 and comprising a front face 4. Usually at least one row 5 of adapters 6 suitable to receive thereto corresponding optical connectors 7 from the interior 3 and from the exterior is arranged in the front face 4 spanning essentially across a total width 8 of the front face 7. As best visible in FIG. 3, the first variation comprises a first row 5 of adapters 6 and a second row 21 of adapters 6 arranged in the front face 4 laterally offset z from each other with respect to their general direction y, each spanning essentially a total width 8 of the front face 4. Here the adapters 6 have received optical connectors 7 from the interior 3, but not from the exterior. Each row 5, 21 of adapters 6 consists in the shown variation of six adjacent duplex connectors, however the number of connectors and their type may generally vary. The connectivity module 1 allows to interconnect at least one optical cable 10 to at least one of the adapters 6 on the interior. For routing the at least one optical cable 10 the connectivity module 1 comprises at least one cable channel 9 being with respect to the general direction y of the row 5 of adapters 6 arranged laterally offset z, for routing therein at least one optical cable 10 across the front face 4. This is best visible in FIGS. 1 and 5.

As shown in FIG. 5, the cable channel 9 is arranged in a side face 11 of the housing 2 as an elongated indentation 9 accessible from the exterior. The cable channel 9 has the shown variation an essentially U-shaped cross-section, as visible in FIG. 3. As can further be seen, the lateral offset z between the first and the second row 5, 21 is essentially equal to a (first) diameter of the cable channel 9 leading into the front face 4 between the first and the second row 5, 21.

Typically, the housing 2 comprises a front section 14 and a rear section 16 adjoining the front section 14. As shown in FIG. 1, the front section 14 comprises the front face 4, a first side face 11 having arranged therein the at least one cable channel 9 and a second side face 15 extending essentially parallel to the first side face 11. The first and the second side face 11, 15 respectively adjoin the front face 4 essentially perpendicular on opposite ends. As displayed in FIGS. 4 and 5, the rear section 16 comprises an arch-shaped rear wall 17, wherein the rear section 16 has a width less than or equal to the total width 8 of the front face 4. In the variation shown, the arch-shaped rear wall 17 has a curvature greater than a minimal bend radius of an optical cable 10, such that optical cables 10 can be routed along the rear wall 17 on the exterior and/or on the interior 3.

The housing 2 comprises here a detachable top cover 33 and a thereto essentially parallel arranged detachable bottom cover 34, respectively adjoining the front face 4 essentially perpendicular on opposite ends of the front face. The front section 14 is in the shown variation essentially box-shaped as shown in FIG. 5.

Figure 4:
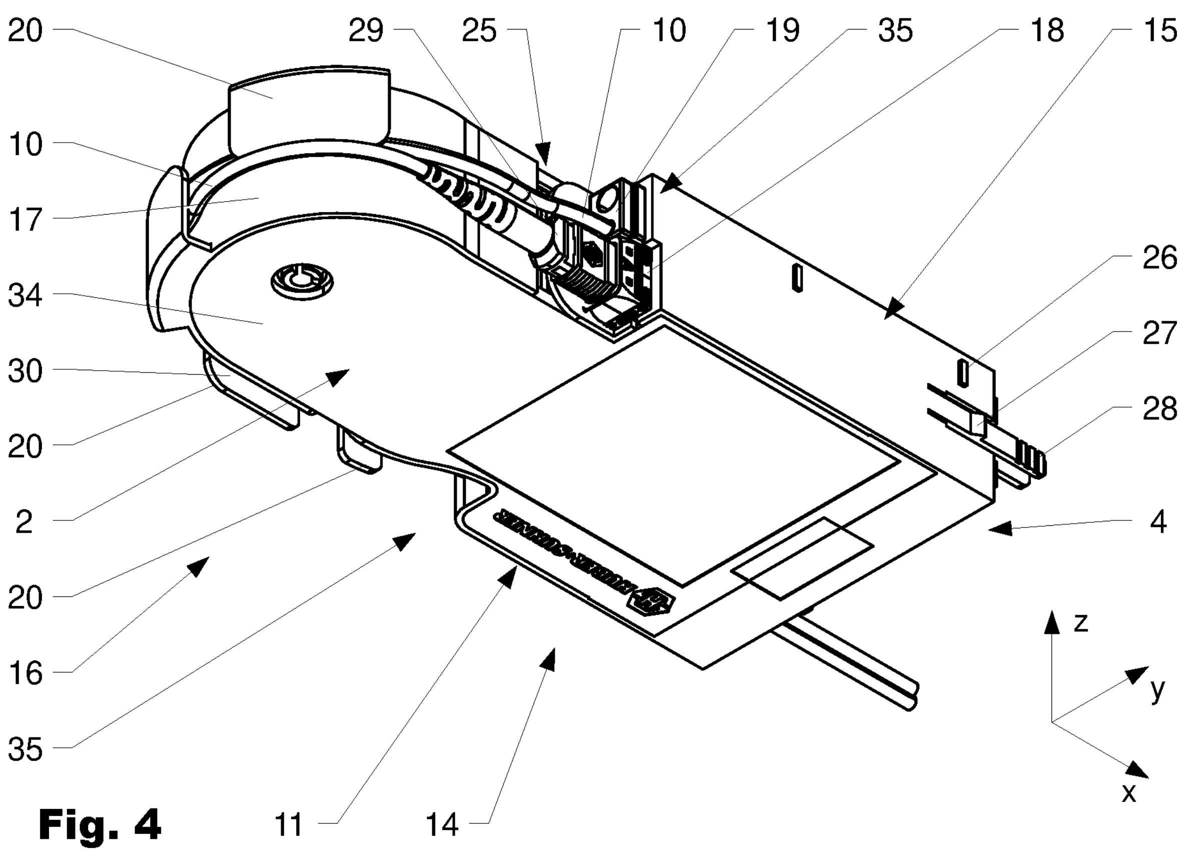
FIG. 4 shows a perspective view of the first variation of FIG. 1.

As shown in FIG. 4, the connectivity module 1 comprises in an intermediate region 35 between the front section 14 and the rear section 16 at least one auxiliary connector 18 arranged adjacent to the rear wall 17 and the second side face 15 for interconnecting an optical cable 10 to at least one of the adapters 7 on the interior 3. As shown in FIG. 4, the optical cable 10 is connectable to the auxiliary connector 18 via a plug (MTP) 29. The shown variation comprises in additions at least one cable gland 19 adjacent to the rear wall 17 and the second side face 15 for leading the optical cable 10 into the interior 3. Here the intermediate region 35 is formed as an offset between the second side face 15 and the rear wall 17 extending inwardly and essentially parallel to the front face 4. Typically, a connectivity module 1 according to the disclosure comprises either one or more auxiliary connectors 18 or one or more cable glands 19.

The first variation, as shown in FIG. 1, comprises at least one cable holder 20 arranged at the rear section 16. Here four L-shaped cable holders 20 are arranged extending partially away from the rear wall 17 and partially parallel to rear wall 17. The cable holders 20 comprise a guiding surface 30 arranged facing the rear wall 17 for guiding an optical cable 10 routed externally along the rear wall 17.

FIG. 6 shows a detailed view of FIG. 5 displaying hidden lines to give insight into the interior 3 of the connectivity module 1. It can be observed that the shown variation comprises an interior partitioning wall 22 extending at least partially between the first and the second row 5, 21 of adapters 6 spatially partitioning the interior 3 into a first level 23 extending from the first row 5 of adapters and a second level 24 extending thereto essentially parallel from the second row 21 of adapters 6. In order to easily route optical cables 10 during assembly or installation of the connectivity module 1 between the first and the second level 23, 24, the connectivity module 1 comprises a feedthrough arrangement 25. The feedthrough arrangement 25 comprises typically an internal opening 31 in the partitioning wall 22 forming a feedthrough for routing optical cables 10 from the first level 23 to the second level 24 or vice versa. In the shown variation, the feedthrough arrangement 25 additionally comprises a lateral opening 32 in the housing 2 accessible from the exterior and adjoining the internal opening 31. In particular, the lateral opening 32 spans between the top cover 33 and the bottom cover 34.

In order to install the connectivity module 1 in corresponding chassis (not shown), the first side face 5 comprises guiding means 12 and retaining means 13. In the shown first variation shown in FIGS. 1, 3 and 5, the first side face 5 and the second side face 15 respectively comprise retaining means 13. The retaining means 13 comprise a wedge-shaped latch 27 protruding from a lever 28. The wedge-shaped latches 27 are configured to engage with a corresponding indentation of the chassis. Since the latches 27 are arranged on the respective lever 28, the latches 27 can be released from the corresponding indentation of the chassis by actuating the lever 28 inwardly.

As illustrated in FIG. 5, the guiding means 12 extend generally parallel to the cable channel 9. Here the guiding means 12 are incorporated respectively into the first and second side faces 5, 11. The guiding means 12 comprise guide surfaces extending adjacent to the cable channel 9 along the respective side faces 5, 11, for engaging during installation with the corresponding chassis, in particular a sub-chassis thereof.

Rather, the words used in the specification are words of description rather than limitation, and it is understood that various changes may be made without departing from the scope of the disclosure.

The invention claimed is:

1. An optical connectivity module suitable for installation in a corresponding chassis, the connectivity module comprising:

a. a housing defining an interior space for internal routing of multiple optical fibers;

b. the housing comprising a front face with at least one row of adapters suitable to receive thereto corresponding optical connectors from the interior and from the exterior, the row of adapters being arranged in the front face spanning essentially across a total width of the front face;

c. the housing comprising a front section comprising the front face, a first side face having arranged therein the at least one cable channel and a second side face extending essentially parallel to the first side face, wherein the first and the second side faces respectively adjoin the front face essentially perpendicular on opposite ends and a rear section adjoining the front section and comprising an arch-shaped rear wall, wherein the rear section has a width less than or equal to the total width of the front face; and d. at least one cable channel leading into the front face by a mouth-opening being with respect to the general direction (y) of the row of adapters arranged laterally offset (z), for routing therein at least one optical cable through the front face being during operation interconnected to at least one of the adapters of the row of adapters in the interior space.

2. The optical connectivity module according to claim 1, wherein the arch-shaped rear wall has a curvature greater or equal to a minimal bend radius of an optical cable, such that the optical cable is configured to be routed along the rear wall on at least one of the exterior and on the interior.

3. The optical connectivity module according to claim 1, wherein the connectivity module comprises at least one out of the following for interconnecting an optical cable to at least one of the adapters on the interior:

a. an auxiliary connector arranged adjacent to the rear wall and the second side face; and b. a cable gland arranged adjacent to the rear wall and the second side face for leading the optical cable into the interior.

4. The optical connectivity module according to claim 1, wherein at least one cable holder being arranged at the rear section comprises a guiding surface extending at least partially parallel to the rear wall, for holding and guiding at least one optical cable routed externally along the rear wall.

5. The optical connectivity module according to claim 1, wherein a first row of adapters and a second row of adapters are arranged in the front face laterally offset (z) from each other with respect to their general direction (y), each spanning essentially a total width of the front face.

6. The optical connectivity module according to claim 5, wherein the lateral offset (z) between the first and the second row being essentially equal to a diameter of the cable channel leading into the front face between the first and the second row.

7. The optical connectivity module according to claim 5, wherein the housing comprises an interior partitioning wall extending at least partially between the first and the second row of adapters and spatially partitioning the interior into a first level extending from the first row and a second level extending from the second row.

8. The optical connectivity module according to claim 7, wherein the connectivity module comprises a feedthrough arrangement comprising an internal opening in the partitioning wall forming a feedthrough for routing optical cables from the first level to the second level or vice versa.

9. The optical connectivity module according to claim 8, wherein the feedthrough arrangement comprises a lateral opening in the housing accessible from the exterior and adjoining the internal opening.

10. The optical connectivity module according to claim 1, wherein the housing comprises a detachable top cover and a thereto essentially parallel arranged detachable bottom cover, respectively adjoining the front face essentially perpendicular on opposite ends of the front face.

11. The optical connectivity module according to claim 1, wherein the front section comprises at least one guiding means which extends essentially parallel to the cable channel, for guiding the connectivity module during insertion into the corresponding chassis.

12. An optical connectivity module suitable for installation in a corresponding chassis, the connectivity module comprising:

a. a housing defining an interior space for internal routing of multiple optical fibers;

b. the housing comprising a front face with at least one row of adapters suitable to receive thereto corresponding optical connectors from the interior and from the exterior, the row of adapters being arranged in the front face spanning essentially across a total width of the front face;

c. at least one cable channel extending along direction (x) from a rear to a front of the module (1) and leading into the front face by a mouth-opening arranged with respect to a general direction (y) of the row of adapters laterally offset (z), for routing therein at least one optical cable across the front face and during operation interconnected to at least one of the adapters of the row of adapters in the interior space.

13. The optical connectivity module of claim 12, wherein the cable channel is arranged in a side face of the housing as an elongated indentation accessible from the exterior.

14. The optical connectivity module according to claim 13, wherein the side face comprises retaining means configured to engage with the corresponding chassis, such that in the mounted position a predefined installation position is retained, the retaining means comprising at least one selected from a group consisting of:

a. at least one protrusion extending from the side face for engaging with a corresponding identation of the chassis; and b. at least one latch for engaging with a corresponding indentation of the chassis and to the latch mechanically interconnected lever for releasing the latch.

15. A chassis configured to receive at least one optical connectivity module according to claim 12, wherein the chassis comprises at least one sub-chassis suitable to receive at least one optical connectivity module.

16. A chassis according to claim 15, comprising at least one sub-chassis suitable to receive two or more optical connectivity modules.

* * * * *